Figure 1:
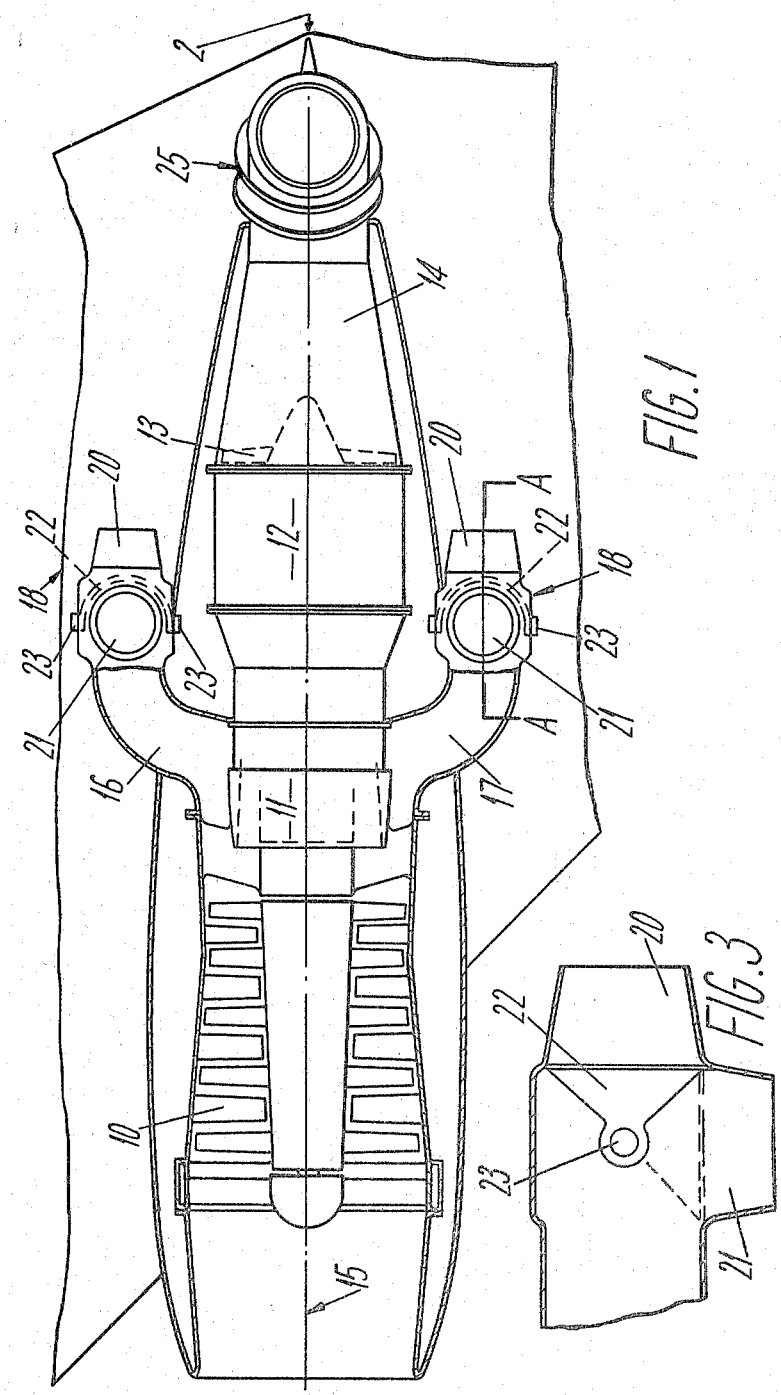

Dec. 13, 1966 S. D. THOMAS 3,290,885
GAS TURBINE JET PROPULSION ENGINE FOR V.T.O.L. AIRCRAFT
Filed June 29, 1964 3 Sheets-Sheet 1

INVENTOR
Samuel David Thomas
BY
Cushman, Darby & Cushman
ATTORNEYS

Dec. 13, 1966 S. D. THOMAS 3,290,885
GAS TURBINE JET PROPULSION ENGINE FOR V.T.O.L. AIRCRAFT
Filed June 29, 1964 3 Sheets-Sheet 2
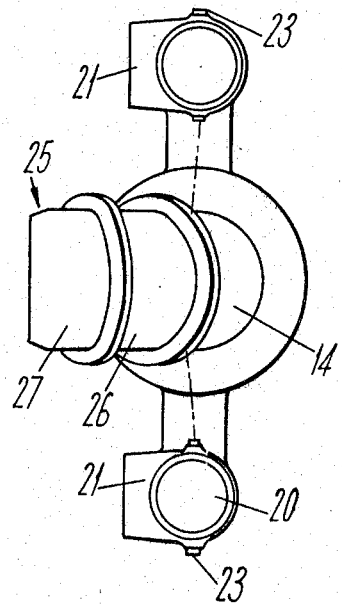
FIG. 2
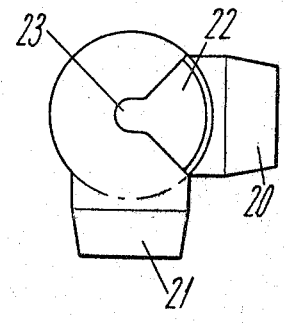
FIG. 6
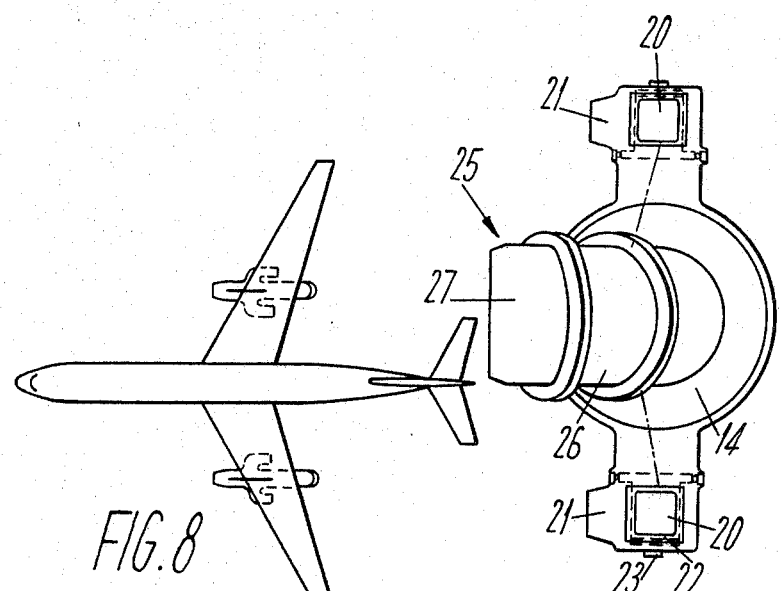
FIG. 8
FIG. 5
INVENTOR
Samuel David Thomas
BY Cushman, Darby & Cushman
ATTORNEYS Dec. 13, 1966 S. D. THOMAS 3,290,885
GAS TURBINE JET PROPULSION ENGINE FOR V.T.O.L. AIRCRAFT
Filed June 29, 1964 3 Sheets-Sheet 3
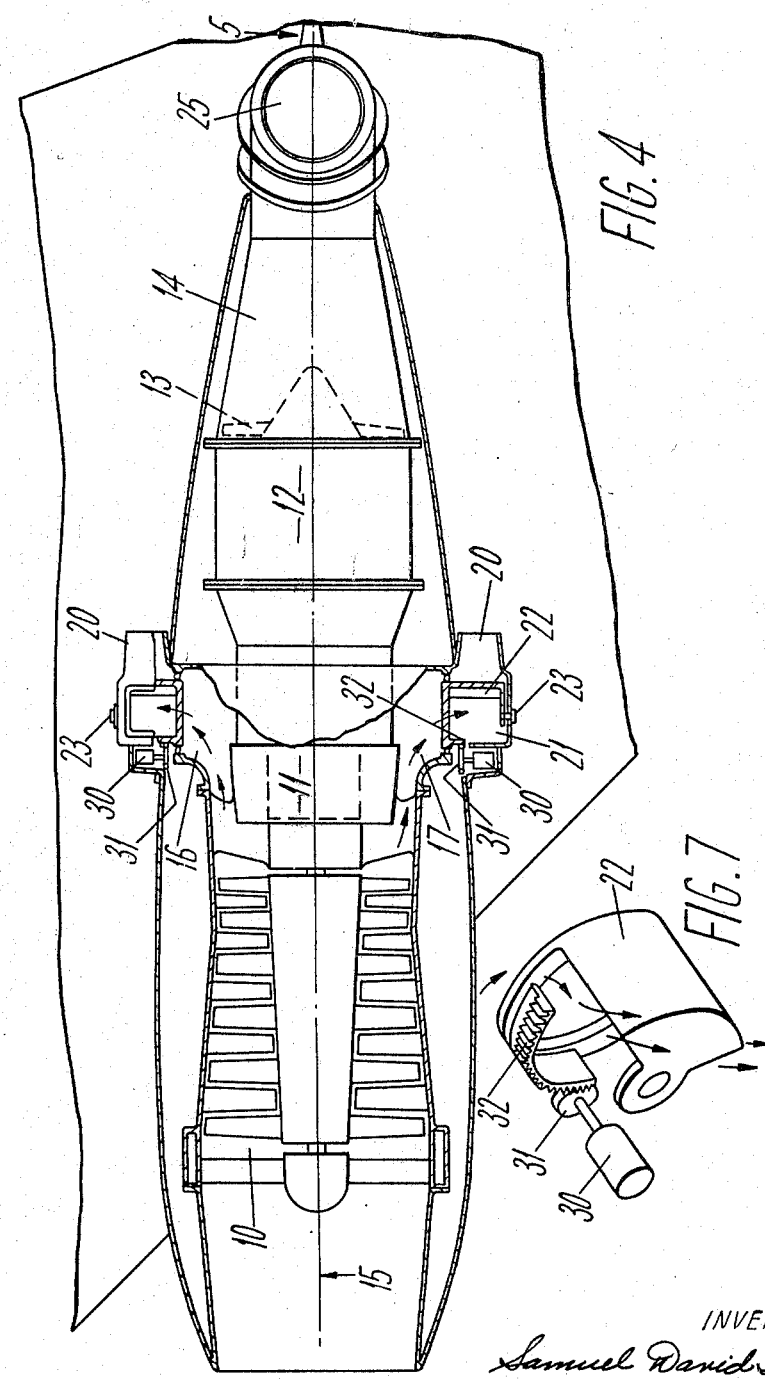
INVENTOR
Samuel David Thomas
BY
Cushman, Darby & Cushman
ATTORNEYS

United States Patent Office 3,290,885
Patented Dec. 13, 1966

3,290,885
GAS TURBINE JET PROPULSION ENGINE
FOR V.T.O.L. AIRCRAFT
Samuel David Thomas, Derby, England, assignor to Rolls-Royce Limited, Derby, England, a company of Great Britain
Filed June 29, 1964, Ser. No. 378,825
Claims priority, application Great Britain, July 16, 1963, 28,194/63
8 Claims. (Cl. 60—226)

This invention concerns gas turbine jet propulsion engines and aircraft provided therewith. The invention is particularly concerned with engines adapted to provide thrust for vertical take-off and landing as well as thrust for normal flight.

According to the present invention there is provided a gas turbine jet propulsion engine having compressor means, combustion equipment, turbine means and a jet pipe for exhaust gases, all arranged in flow series, said engine also being provided with at least one duct adapted to be supplied directly with some of the air compressed by said compressor means, the or each said duct conducting the air to a pair of propulsion nozzles, and valve means associated with each pair of propulsion nozzles for permitting the compressed air to flow through a selected one of the pair of propulsion nozzles, and for simultaneously preventing the compressed air from flowing through the other propulsion nozzle. Two ducts are preferably disposed on opposite sides of the longitudinal axis of said gas turbine engine.

In one embodiment the compressor means comprises a low pressure compressor and a high pressure compressor, and the turbine means comprises a high pressure turbine and a low pressure turbine which are independently rotatable and which drive the high pressure and low pressure compressors respectively, the compressed air from the low pressure compressor being divided so that part of the air is conveyed through said duct or ducts to either the nozzles or to the jet pipe and part is conveyed to the inlet of the high pressure compressor.

Preferably the propulsion nozzles of each pair are arranged with their axes inclined one to the other. Thus the angle of inclination of said axes may be substantially 90°. Thus, when in use, one nozzle of each pair may direct the air horizontally and rearwardly, and the other nozzle of each pair may direct the air vertically and downwardly.

Each valve means may comprise an obturating member movable between two positions, in the first of which it prevents air passing through one propulsion nozzle while permitting it to flow through the other, and in the second of which it prevents air passing through the said other propulsion nozzle while permitting the air to flow through the said one propulsion nozzle. Preferably, each obturating member is pivotally mounted about an axis perpendicular to both axes of the respective pair of propulsion nozzles.

The obturating member may be a flat or arcuate plate, and may be driven by an air motor between its two positions.

The engine may also be provided with a swivelling exhaust nozzle mounted at the downstream end of said jet pipe for varying the direction of flow of the exhaust gases. Thus the swivelling exhaust nozzle may be movable between two positions in the first of which it may direct the exhaust gases substantially parallel with the longitudinal axis of the engine, and in the second of which it directs the exhaust gases in a direction at substantially 90° to said longitudinal axis.

Preferably means are provided for positioning said valve means and said swivelling exhaust nozzle together, such that compressed air from said propulsion nozzles and exhaust gases from said exhaust nozzle may be directed substantially parallel to one another at all times.

The invention also concerns an aircraft provided with a gas turbine jet propulsion engine as set forth above.

The invention is illustrated, merely by way of example, in the accompanying drawings, in which:

FIGURE 1 is a diagrammatic plan view of the underside of a gas turbine jet propulsion engine according to the present invention, FIGURE 2 is a view of the engine shown in FIGURE 1, taken in the direction of arrow II of that figure, FIGURE 3 is a part-sectional elevation of part of the engine of FIGURE 1, taken on the line A—A of that figure, FIGURE 4 is a diagrammatic plan view of the underside of an alternative form of gas turbine jet propulsion engine according to the present invention, FIGURE 5 is a view of the engine of FIGURE 4 taken in the direction of arrow $\overline{V}$ of that figure, FIGURE 6 is a part sectional elevation of part of the engine of FIGURE 4, taken on line AA of that figure, FIGURE 7 is a general view of part of the engine of FIGURE 4, and FIGURE 8 is a diagrammatic view of an aircraft according to the present invention, provided with one of the engines shown in the preceding figures.

In the drawings, like reference numerals have been used for like components in all figures.

Referring to FIGURES 1–3, a gas turbine jet propulsion engine comprises, in flow series, a low-pressure compressor 10, a high-pressure compressor 11, combustion equipment 12, turbine equipment 13 and a jet pine 14. Part of the air compressed by low-pressure compressor 10 passes through high-pressure compressor 11, combustion equipment 12, turbine 13 and jet pipe 14 to atmosphere. The turbine equipment 13 may, for example, comprise two turbines, drivingly connected by coaxial shafts to the high pressure and low pressure compressors.

The engine is symmetrical about a longitudinal axis 15. Disposed on opposite sides of the axis 15 are two ducts 16, 17. The ducts 16, 17 communicate with the downstream end of the low-pressure compressor 10 and are supplied with air therefrom. Rigidly mounted at the downstream ends of ducts 16, 17 are pairs 18 of propulsion nozzles.

Each pair of propulsion nozzles comprises a rearwardly facing nozzle 20 circular in cross section and having its axis disposed parallel to the axis 15, and a nozzle 21 circular in cross section and having its axis disposed at right angles to that of nozzle 20. With the engine installed in an aircraft, and in normal use, the nozzles 20 and 21 are disposed with their axes horizontal and vertical, respectively. However, this is not the only configuration possible, since the included angle between the axes of nozzles 20 and 21 could be of any value, depending upon the variation in direction of thrust required in operation.

Disposed within the outlets from ducts 16, 17 and between nozzles 20, 21 are semi-cylindrical plates 22. Each plate 22 is pivoted about pivots 23 on an axis which is disposed at right angles to the axes of both nozzles 20 and 21. Each plate 22 is rotatable between two positions, in the first of which, shown in full lines in FIGURE 3, it prevents air passing through nozzle 20, and permits it to pass through nozzle 21. In the second position, shown in chain lines in FIGURE 3, each plate 22 prevents air passing through nozzle 21 and permits air to pass through nozzle 20.

Attached to the downstream end of the jet pipe 14 is a swivellable exhaust nozzle 25, such, for example, as that described and claimed in U.S. Patent 2,933,891. Swivellable exhaust nozzle 25 comprises relatively rotatable pipes 26, 27 which may be so orientated that the exhaust gases flowing therethrough may be directed in a direction parallel with the longitudinal axis 15 of the engine (i.e., horizontally in normal flight), or in a direction at a right angle to this (i.e., vertically downwardly in normal flight) as shown in full lines in FIGURES 1 and 2.

Thus the engine provides, in effect, three nozzles by means of which thrust may be provided vertically downwardly for vertical take off or landing, and horizontally for normal powered flight. In the first of these conditions, nozzles 21 are used, together with swivellable exhaust nozzle 25 in its full line position shown. In the second condition, for horizontal flight, nozzles 20 are used in their dotted line positions together with swivellable exhaust nozzle 25. For horizontal flight, the nozzle 20 need not be used of course, in which case means may be provided for preventing air being bled from the compressor means through ducts 16, 17.

The engine shown in FIGURES 4–7 is identical to that described above with reference to FIGURES 1–3 except that the forms of the ducts 16, 17, exhaust nozzles 20, 21 and plate 22 are different.

Thus, as seen in FIGURES 4–7, the ducts 16, 17 are much shorter than in the embodiment of FIGURES 1–3, and do not extend laterally of the engine. The nozzles 20, 21 are rectangular in cross-section, and not circular, as in FIGURES 1–3. The plates 22 are quadrant shaped, as seen in FIGURES 6 and 7. The action of plates 22 and swivellable exhaust nozzle 25 is identical to that of the embodiment of FIGURES 1–3.

In FIGURES 4 and 7 there is shown one way in which the plates 22 may be rotated in either of the embodiments described. An air motor 30 is provided for each plate 22. Each air motor 30 drives a toothed wheel 31 which meshes with a toothed segment 32 attached to the plate 22.

It will be appreciated that in both embodiments described above, the jet exhaust gases need not be directed through a swivelling type nozzle such as that disclosed, but could pass through a pair of exhaust nozzles, for example, provided with rotating cascade vanes such as those disclosed in our U.S. Patent No. 3,130,543. In each case, the deflection of the exhaust gases issuing from the jet pipe 14 is maintained in synchronism with the pivoting movement of the deflector plates 22 so that the direction of the compressed air efflux from nozzles 20, 21 is parallel to the jet efflux from nozzle 25. For this purpose the plates 22 and nozzle 25 are interconnected in any convenient manner, as indicated by chain-dotted lines in FIGURES 2 and 5.

The ducts 16, 17 could communicate with the jet pipe 14 of the engine, thus providing a by-pass engine. In such an arrangement, a valve could of course be provided for permitting and preventing flow through the by-pass passage to the jet pipe when air is respectively prevented and permitted to flow to the nozzles 20, 21.

I claim:

1. A gas turbine jet propulsion engine having compressor means, combustion equipment, turbine means and a jet pipe for exhaust gases, all arranged in flow series, said engine also being provided with two ducts disposed symmetrically on opposite sides of the longitudinal axis of the engine and adapted to be supplied directly with some of the air compressed by said compressor means, a pair of fixed propulsion nozzles having their axes inclined at a fixed angle to each other and mounted in each duct for receiving air conducted by said ducts, and valve means associated with each pair of propulsion nozzles for permitting the compressed air to flow through a selected one of the pair of propulsion nozzles, and for simultaneously preventing the compressed air from flowing through the other propulsion nozzle.

2. A gas turbine jet propulsion engine as claimed in claim 1 in which the compressor means comprises a low pressure compressor and a high pressure compressor in flow series and the turbine means comprises a high pressure turbine and a low pressure turbine in flow series, said ducts being supplied directly with a portion of the air compressed by said low pressure compressor, the rest of the air flowing to the inlet to the high pressure compressor.

3. A gas turbine jet propulsion engine as claimed in claim 1 in which the angle of inclination of the axes of said propulsion nozzles of each pair of nozzles is substantially 90°.

4. A gas turbine engine as claimed in claim 1 in which each said valve means comprises an obturating member pivotally mounted about an axis perpendicular to both axes of the propulsion nozzles constituting the respective pair of propulsion nozzles.

5. A gas turbine jet propulsion engine as claimed in claim 4 in which each of said propulsion nozzles is circular in cross section and the obturating member comprises a semi-cylindrical obturating plate.

6. A gas turbine jet propulsion engine as claimed in claim 4 in which each of said propulsion nozzles is rectangular in cross section and said obturating member has a quadrant shape.

7. A gas turbine jet propulsion engine as claimed in claim 1 and including a swivelling exhaust nozzle mounted at the downstream end of said jet pipe for varying the direction of flow of the exhaust gases.

8. A gas turbine jet propulsion engine as claimed in claim 7 including means for positioning said valve means and said swivelling exhaust nozzle together, such that compressed air from said propulsion nozzles and exhaust gases from said exhaust nozzle may be directed substantially parallel to one another at all times.

References Cited by the Examiner

UNITED STATES PATENTS

| 2,774,554 | 12/1956 | Ashwood et al. | |
| 3,096,954 | 7/1963 | Bauger et al. | 244—23 |
| 3,191,886 | 6/1965 | Lewis et al. | 60—35.55 X |

FOREIGN PATENTS

| 1,064,817 | 9/1959 | Germany. |
| 881,967 | 11/1961 | Great Britain. |

CARLTON R. CROYLE, *Primary Examiner.*

MARK NEWMAN, *Examiner.*